US006863104B2

(12) United States Patent
Okayasu et al.

(10) Patent No.: US 6,863,104 B2
(45) Date of Patent: Mar. 8, 2005

(54) THERMALLY ACTIVATING APPARATUS AND PRINTER FOR HEAT-SENSITIVE ADHESIVE SHEET

(75) Inventors: Takanori Okayasu, Chiba (JP); Shinichi Yoshida, Chiba (JP)

(73) Assignee: SII P & S Inc., Chiba (JP)

( * ) Notice: Subject to any disclaimer, the term of this patent is extended or adjusted under 35 U.S.C. 154(b) by 0 days.

(21) Appl. No.: 10/434,320

(22) Filed: May 8, 2003

(65) Prior Publication Data

US 2003/0226642 A1 Dec. 11, 2003

(30) Foreign Application Priority Data

Jun. 5, 2002 (JP) ....................................... 2002-164277

(51) Int. Cl.[7] ................................................ B32B 31/20
(52) U.S. Cl. ....................... 156/351; 156/359; 156/378; 156/379; 347/71
(58) Field of Search ................................ 156/351, 359, 156/361, 378, 379, 379.9, 384, 387; 347/171

(56) References Cited

U.S. PATENT DOCUMENTS 4,449,033 A 5/1984 McClure et al. ............ 219/216
5,711,621 A * 1/1998 Austin ................... 400/120.13
5,767,889 A * 6/1998 Ackley ....................... 347/171
6,172,698 B1 1/2001 Iwata et al. ................. 347/171
6,345,920 B1 2/2002 Enoksson et al. ...... 400/120.12

FOREIGN PATENT DOCUMENTS

WO WO 93/24302 A1 * 12/1993

* cited by examiner

*Primary Examiner*—Chris Fiorilla
*Assistant Examiner*—George Koch
(74) *Attorney, Agent, or Firm*—Adams & Wilks

(57) ABSTRACT

An apparatus for thermally activating a heat-sensitive adhesive sheet of the type having a printable surface on one side, a heat-sensitive adhesive layer on the other side and sheet identifying information including information concerning one or more properties of the adhesive used in the adhesive layer, comprises an energizeable heating unit for heating the heat-sensitive adhesive layer to activate the same, a reading sensor for reading the sheet identifying information, and a control section for controlling energy applied to the heating unit on the basis of the sheet identifying information read by the reading sensor. The control section controls the energy applied to the heating unit by keeping the amplitude of applied voltage pulses constant and varying the pulse width. An ambient-temperature measuring sensor measures temperature in the vicinity of the heating unit and the control section controls the energy applied to the heating unit on the basis of the temperature measured by the ambient-temperature measuring sensor.

13 Claims, 6 Drawing Sheets

THERMALLY ACTIVATING APPARATUS AND PRINTER FOR HEAT-SENSITIVE ADHESIVE SHEET

BACKGROUND OF THE INVENTION

1. Field of the Invention

The present invention relates to a thermally activating apparatus for a heat-sensitive adhesive sheet, for example, used as an adhesive label, having a heat-sensitive adhesive layer that exhibits a non-bonding property normally and expresses a bonding property by heat on one side of a sheet-like substrate, and to a printer using the thermally activating apparatus, and more particularly, relates to a technique effective in application for energy control when the heat-sensitive adhesive layer is thermally activated.

2. Description of the Related Art

Many labels adhered to commodities and used for barcode or price indication have recently had a pressure-sensitive adhesive layer on the back of a recording surface (printing surface), on which a released paper (separator) was bonded, and were stored in a temporarily bonded state. However, when these types of adhesive labels are used as labels, the released paper must be released from the pressure-sensitive adhesive layer, thus having a problem in that refuse is inevitably produced.

Accordingly, a heat-sensitive adhesive label and a thermally activating apparatus have been developed as a system that requires no released paper, the adhesive label having on the back of a label-like substrate a heat-sensitive adhesive layer that exhibits a non-bonding property normally but expresses a bonding property by heat, and the thermally activating apparatus heating the heat-sensitive adhesive layer on the back of the label to make it exhibit a bonding property.

Various types of heating systems have been proposed for the thermally activating apparatus, which employ a heating roll system, a hot-air blowing system, an infrared-ray radiating system, and a system using an electric heater or a dielectric coil as a heating means. For example, Japanese Unexamined Patent Application Publication No. 11-79152 discloses a technique in which a head having one or a plurality of resistance elements (heating devices) provided on a ceramic substrate as a heat source, such as a thermal head used as a printing head of a thermal printer, is brought into contact with a heat-sensitive adhesive label to heat a heat-sensitive adhesive layer.

The thermally activating apparatus for the heat-sensitive adhesive layer that is disclosed in the Japanese Unexamined Patent Application Publication No. 11-79152 is composed of a thermally activating platen roller serving as a transfer means for carrying a heat-sensitive adhesive label and a thermally activating thermal head having a heating device serving as a heating means. The heating device is formed of a heating resistance element formed on a ceramic substrate, on which a protective film made of glass ceramics is formed so as to cover the surface of the heating resistance element. The thermally activating platen roller functions also as a pressurizer for sandwiching the heat-sensitive adhesive label between it and the heating device.

According to the aforesaid prior art, since the heating device is heated by energizing the heating device in a state in which the thermal head serving as a heating means is in contact with the heat-sensitive adhesive layer, the heat-sensitive adhesive layer is thermally activated reliably;

moreover, since the heat from the heating device can efficiently be conducted to the heat-sensitive adhesive layer, there is an advantage of requiring less power consumption.

In the thermally activating apparatus that uses the aforesaid thermal head as a heating means, generally, energy is applied to each heating device by the energization/break of one pulse to activate the adhesive of the heat-sensitive adhesive sheet. In this case, since the thermal head is subjected to relatively high energy at a time because it includes a plurality of heating devices, the caloric value of the thermal head is increased to increase the ultimate temperature of the surface inevitably. Accordingly, the surface temperature of the thermal head becomes higher than the carbonizing temperature of a resin component of the adhesive; thus, the resin component is sometimes carbonized and fixed to the surface of the thermal head. On the other hand, when the amount of energy applied with one pulse is set small so that the surface temperature of the thermal head does not exceed the resin carbonizing temperature, the adhesive cannot sufficiently be activated, thus posing a problem in that the bonding property is decreased.

FIG. 7 shows an energy control method in the conventional thermally activating apparatus, showing the relationship between an energized pulse (b) and surface temperature (a) of the thermal head. A case of repeating an operation of carrying a voltage of 24 V for 1 ms and breaking it for 2 ms is shown as an example. By the method of FIG. 7, a portion of the heat-sensitive adhesive sheet, which is in contact with the thermal head, is thermally activated by passing one pulsed electricity to transfer the heat-sensitive adhesive sheet, and the whole surface of the heat-sensitive adhesive sheet is thermally activated by sequentially passing pulsed electricity. Here, since the amount of heat (energy) generated from the heating device (resistance element) of the thermal head is proportional to the second power of the carried voltage and time, the diagonally shaded areas of FIG. 7(*b*) correspond to energy that is transmitted from the heating device to the heat-sensitive adhesive.

As shown in FIG. 7, when the energy necessary for activating the heat-sensitive adhesive is applied with one pulse, the heating device continues to generate heat for 1 ms, thus suddenly increasing the surface temperature of the thermal head. Therefore, the surface temperature of the thermal head sometimes reaches 300° C. although a heat-sensitive adhesive having a resin carbonizing temperature of, for example, 250° C. is used.

As described above, according to the conventional energy control method, the surface temperature of the thermal head exceeds the resin carbonizing temperature of the heat-sensitive adhesive, therefore posing a problem of carbonizing and fixing a resin component. In other words since the carbide of the resin component prevents heat transfer from the thermal head to the heat-sensitive adhesive, energy transfer efficiency is decreased, thus producing a problem of not exhibiting the bonding property of the heat-sensitive adhesive sufficiently.

Since the optimum energy for thermal activation differs depending on the type of the heat-sensitive adhesive and ambient temperature, there is a problem in that it is difficult to exhibit a desired bonding property.

FIG. 8 shows the relationship between a bonding property that is exhibited, for example, when two types of adhesives A and B are subjected to a thermal energy of 0.6 mJ, and ambient temperature. The adhesive A (shown by a solid line in the drawing) is of low-temperature bonding type which is easily thermally activated in a relatively low temperature range (for example, to 10° C.), and the adhesive B (shown by a dashed and dotted line in the drawing) is of a normal-temperature type which is easily thermally activated in a normal temperature range (for example, 15° C. to 25° C.).

For example, when an energy of 0.6 mJ is applied to such two types of adhesives at an ambient temperature in the vicinity of $T_A$ for thermal activation, the adhesive A can exhibit a predetermined bonding property F or more; however, the adhesive B exhibits a bonding property of F or less. In other words, when the adhesive B is thermally activated at an ambient temperature in the vicinity of $T_A$, it is necessary to apply more energy (for example, to increase energizing time).

However, in the conventional thermally activating apparatus, since the applied energy is not strictly controlled depending on the type of adhesive and ambient temperature, a desired bonding property could not be exhibited.

SUMMARY OF THE INVENTION

The object of the present invention is to provide a thermally activating apparatus and a printer for a heat-sensitive adhesive sheet capable of preventing adhesive of a heat-sensitive adhesive sheet from being carbonized to be fixed on the surface of a thermal head to improve efficiency of energy transmission to the adhesive and invariably exhibiting a desired bonding property by optimally controlling energy to be applied.

The present invention has been made to achieve the above object, wherein a thermally activating apparatus for a heat-sensitive adhesive sheet comprises at least a thermally activating heating means for heating to activate a heat-sensitive adhesive layer of a heat-sensitive adhesive sheet, the adhesive sheet having a printable surface formed on one side of a sheet-like substrate thereof and having the heat-sensitive adhesive layer on the other side, and further comprises an energy control means for controlling energy applied to the thermally activating heating means by a pulse-width control system whereby the amplitude of the applied voltage pulse is kept constant and the pulse width is varied. Particularly, a system of keeping the period and amplitude of the applied voltage pulse constant and varying the duty ratio of the pulse is called a pulse-width modulation (PWM) system.

For example, when the applied energy is increased, the pulse width is controlled to be increased; and when the applied energy is decreased, the pulse width is controlled to be decreased. More specifically, after the temperature of the heating means has been increased to some extent by passing electric current with a large-width pulse, energization/break is repeated with a small-width pulse, so that a constant temperature is kept.

Accordingly, the temperature can be kept lower than a carbonizing temperature (for example, 250° C.) of the resin component (for example, acrylic resin) of the heat-sensitive adhesive, and energy necessary for activating the adhesive can sufficiently be applied. Consequently, the resin can be prevented from being carbonized on the surface of the thermally activating heating means; thus, energy can efficiently be transmitted from the heating means to the heat-sensitive adhesive, thus exhibiting a desired bonding property.

Particularly, it is effective in using a thermal head composed of a plurality of heating devices as the thermally activating heating means.

The heat-sensitive adhesive sheet has sheet identifying information including information on a heat-sensitive adhesive used for the sheet; the thermally activating apparatus comprises a sheet-identifying-information reading means capable of reading the sheet identifying information; and the energy control means controls the energy applied to the thermally activating heating means on the basis of the information obtained by the sheet-identifying-information reading means.

More specifically, the sheet identifying information includes information on the thermal activation of the heat-sensitive adhesive used for the sheet; and the sheet-identifying-information reading means obtains the information on the thermal activation of the heat-sensitive adhesive. It can be achieved, for example, by using a bar-code as the sheet identifying information and using a bar-code reader as the sheet-identifying-information reading means.

Also, a thermally activating apparatus may comprise an information storage means for recording information on the thermal activation of the heat-sensitive adhesive; and the energy control means may obtain the information on the thermal activation of the heat-sensitive adhesive from the information storage means on the basis of the information obtained by the identifying-information reading means, and may control the energy applied to the thermally activating heating means. For example, markings (sheet identifying information) for discriminating the type of sheet are put onto the heat-sensitive adhesive sheet; the used heat-sensitive adhesive is discriminated by reading the markings; and information on the thermal activation of the adhesive is obtained from information storage means, such as an ROM, an RAM, and a hard disc, provided in the thermally activating apparatus.

Here, the information on the thermal activation of the heat-sensitive adhesive may include, for example, the relationship among ambient temperature, applied energy, and an exhibited bonding property (for example, data corresponding to the graph in FIG. 8 and information on temperature characteristics), the type of adhesive, carbonizing temperature of a resin component and so on.

Accordingly, the most suitable energy can be applied for each type of used adhesives, thus facilitating support for different types of heat-sensitive adhesive sheets.

There is provided an ambient-temperature measuring means for measuring temperature in the vicinity of thermally activating processing of the heat-sensitive adhesive sheet by the thermally activating heating means; the energy control means controls the energy applied to the thermally activating heating means on the basis of the temperature measured by the ambient-temperature measuring means. The ambient-temperature measuring means may be, for example, a thermistor for measuring temperature provided on the control substrate, and the like.

In other words, the energy to be applied is determined in accordance with the information obtained by the sheet-information reading means on the basis of the ambient temperature in thermally activating processing; and the width of the pulse (energizing conditions) to be energized is changed by PWM driving of the energy control means so that the energy is applied to the thermally activating heating means, thus allowing to relatively easily respond to variations in ambient temperature so that a sufficient bonding property can be exhibited.

With the foregoing thermally activating apparatus for the heat-sensitive adhesive sheet and the printer having the printing means for printing on the heat-sensitive adhesive sheet, adhesive labels and so on having a high bonding property can efficiently be manufactured.

BRIEF DESCRIPTION OF THE DRAWINGS

For a more better understanding of the present invention, reference is made of a detailed description to be read in conjunction with the accompanying drawings, in which.

DETAILED DESCRIPTION OF THE PREFERRED EMBODIMENT

A preferred embodiment of the present invention will be specifically described hereinafter with reference to the drawings.

Figure 1:
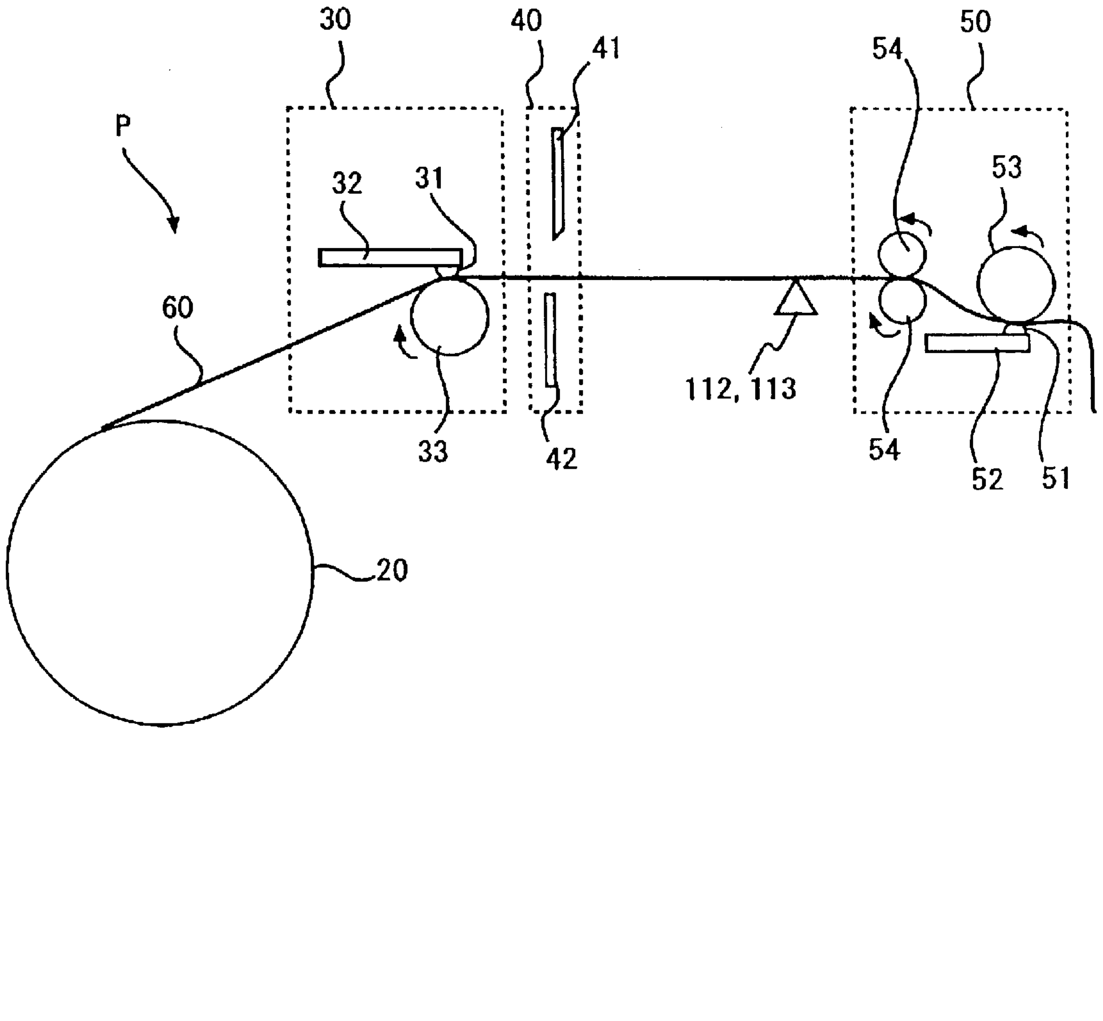
FIG. 1 is a schematic diagram showing a constructional example of a thermal printer using a thermally activating apparatus according to the present invention.

FIG. 1 is a schematic diagram showing the arrangement of a thermally activating apparatus and a thermal printer P using it according to the present invention. The thermal printer P includes a roll housing unit 20 for holding a tape-like heat-sensitive adhesive label 60 wound like a roll, a printing unit 30 for printing onto the heat-sensitive adhesive label 60, a cutter unit 40 for cutting the heat-sensitive adhesive label 60 to a designated length, and a thermally activating unit 50 serving as a thermally activating apparatus for thermally activating a heat-sensitive adhesive layer of the heat-sensitive adhesive label 60.

Here, the heat-sensitive adhesive label 60 used in this embodiment is not particularly limited, however, has an arrangement in which a heat-insulating layer and a heat-sensitive color-forming layer (printable surface) are formed on the surface of a label substrate, and a heat-sensitive adhesive layer that is formed such that it is coated with a heat-sensitive adhesive and is then dried is formed on the back. The heat-sensitive adhesive layer is formed of a heat-sensitive adhesive with a thermoplastic resin, a solid plastic resin and so on as the main component. The heat-sensitive adhesive label 60 may be one that has not the insulating layer or one that has a protective layer or a colored printing layer (preprinted layer) on the surface of the heat-sensitive color-forming layer.

The surface (or the back) of the heat-sensitive adhesive label 60 has a bar-code including information on the type of the heat-sensitive adhesive, carbonizing temperature of a resin component used in the adhesive, and energy necessary for thermally activating the heat-sensitive adhesive, and so on.

The printing unit 30 includes a printing thermal head 32 having a plurality of heating devices 31 formed of a plurality of relatively small resistance elements that is arranged in the width direction so as to be capable of dot printing, and a printing platen roller 33, which is brought into pressure contact with the printing thermal head 32. The heating devices 31 have the same arrangement as a printing head of a well-known thermal printer having a glass ceramics protective film on the surface of each of the plurality of heating resistance elements formed on the ceramic substrate; therefore, a detailed description thereof will be omitted.

The printing unit 30 includes a drive system (not shown) including, for example, an electric motor and a gear train, or the like, for driving the rotation of the printing platen roller 33. The printing platen roller 33 is rotated in a predetermined direction by the drive system to draw the heat-sensitive adhesive label 60 out of a roll, and carries the drawn-out heat-sensitive adhesive label 60 in a predetermined direction while printing it with the printing thermal head 32. In FIG. 1, the printing platen roller 33 is rotated clockwise and the heat-sensitive adhesive label 60 is carried to the right.

The printing unit 30 includes a pressurizing means (not shown) formed of a coil spring, a leaf spring or the like, by the biasing force of which the printing thermal head 32 is pressed toward the printing platen roller 33. At that time, by holding the rotary shaft of the printing platen roller 33 and the orientation of the arrangement of the heating devices 31 in parallel, uniform pressure contact can be performed over the width of the heat-sensitive adhesive label 60.

A cutter unit 40 is used to cut the heat-sensitive adhesive label 60 that has been printed with the printing unit 30 into an appropriate length, having a movable blade 41 actuated by the primary drive (not shown) such as an electric motor, a fixed blade 42 arranged to face the movable blade 41, and so on.

Figure 8:
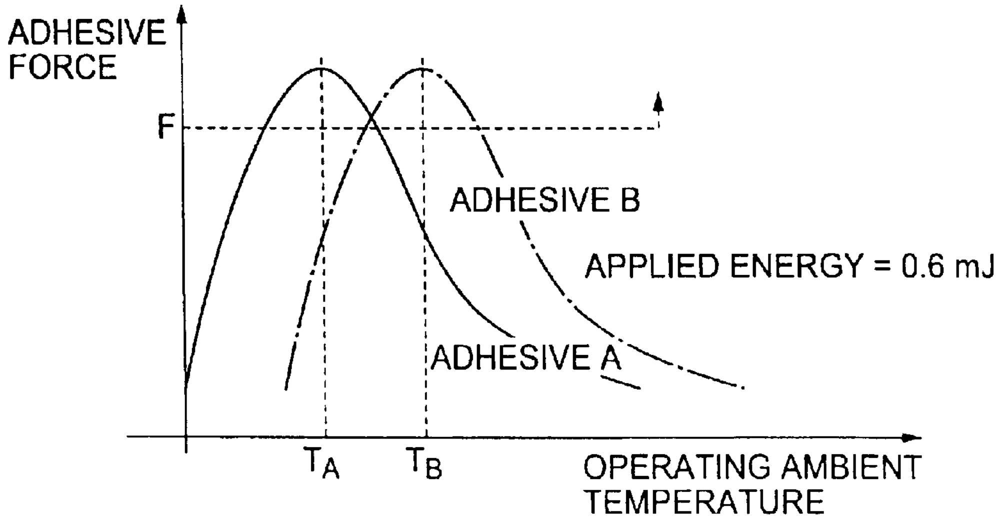
FIG. 8 is a diagram showing the relationship between adhesive force generated when a thermal energy of 0.6 mJ is applied to two types of adhesives A and B and ambient temperature.

A thermally activating unit 50 has in the preceding stage a label-detecting sensor 112 for detecting the presence or absence of the heat-sensitive adhesive label 60. In this embodiment, the label-detecting sensor 112 functions also as a bar-code reading sensor (bar-code reader) 113. The bar-code reading sensor 113 reads out a bar-code affixed on the heat-sensitive adhesive label 60 to obtain information on, for example, the relationship among ambient temperature, applied energy, and an exhibited bonding property (for example, data corresponding to the graph in FIG. 8 and information on temperature characteristics), the type of adhesive, carbonizing temperature of a resin component, and the like.

The thermally activating unit 50 includes a thermally activating thermal head 52 having heating devices 51 and serving as a heating means, a thermally activating platen roller 53 serving as a transferring means for transferring the heat-sensitive adhesive label 60, an inserting roller 54 rotated by, for example, the primary drive (not-shown) for drawing the heat-sensitive adhesive label 60 that has been supplied from the printing unit 30 between the thermally activating thermal head 52 and the thermally activating platen roller 53, and so on.

In this embodiment, the thermally activating thermal head 52 employs the same arrangement as that of the printing thermal head 32, that is, the same arrangement as that of the printing head of the well-known thermal printer having a glass ceramics protective film on the surface of each of the plurality of heating resistance elements formed on the ceramic substrate. However, the heating devices 51 of the thermally activating thermal head 52 do not need to be divided in dots as in the heating devices of the printing head, but may be continuous resistance elements. Using the thermally activating thermal head 52 having the same arrangement as that of the printing thermal head 32 allows common use of parts, thus reducing cost.

The thermally activating unit 50 includes a drive system having, for example, an electric motor and a gear train or the like, for rotating the thermally activating platen roller 53 and the inserting roller 54, by which the thermally activating platen roller 53 and the inserting roller are rotated to transfer the heat-sensitive adhesive label 60 in a predetermined direction (to the right).

The thermally activating unit 50 also includes a pressurizing means (for example, a coil spring or a leaf spring) for pressurizing the thermally activating thermal head 52 toward the thermally activating platen roller 53. At that time, by holding the rotary shaft of the thermally activating platen roller 53 and the orientation of the arrangement of the heating devices 31 in parallel, uniform pressure contact can be performed over the width of the heat-sensitive adhesive label 60.

The platen rollers 33 and 53 and the inserting roller 54 provided to the printing unit 30 and the thermally activating unit 50, respectively, are made of an elastic member such as rubber. For example, they are made of rubber, plastic, urethane, fluoric resin silicone, or the like.

Figure 2:
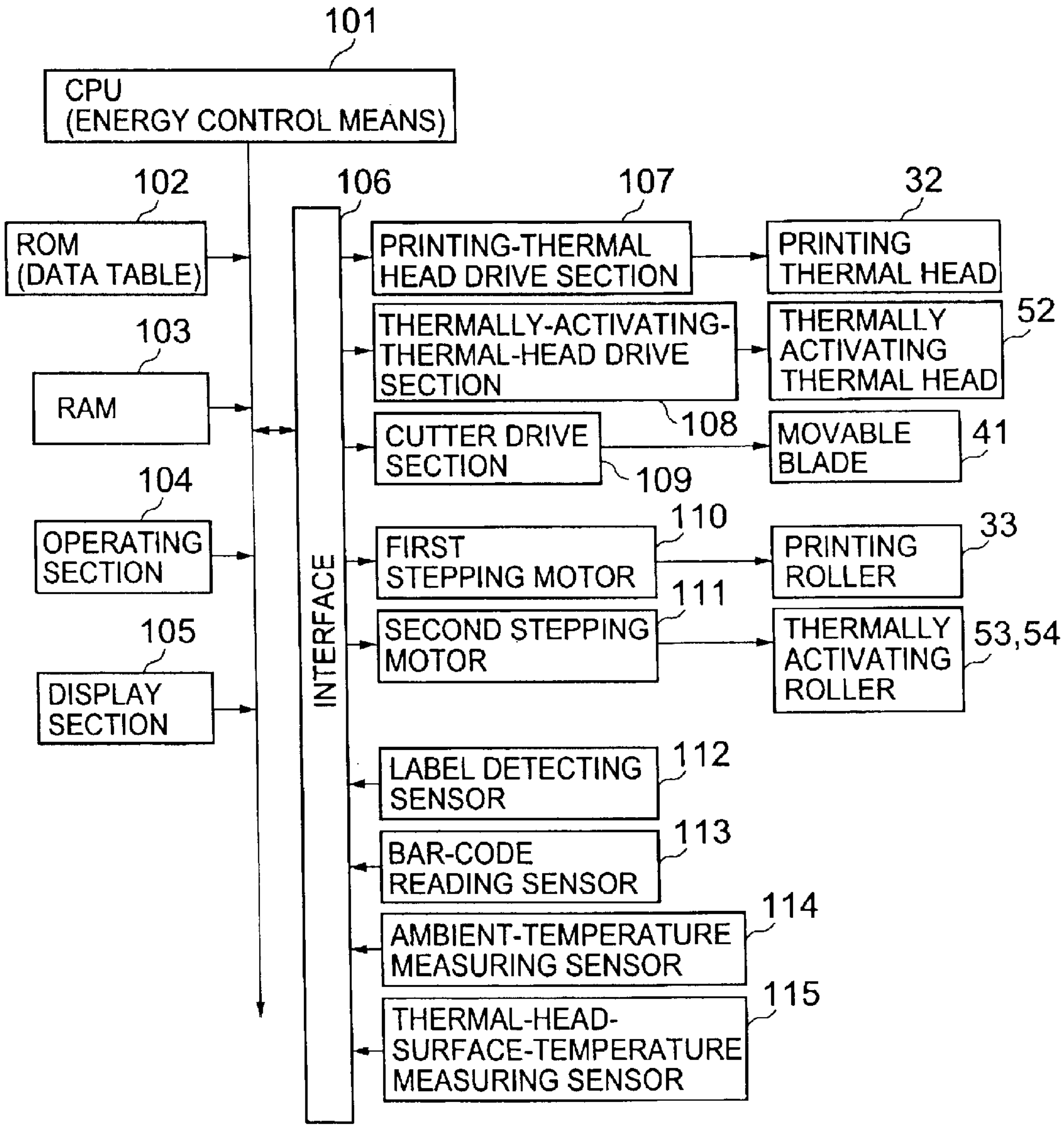
FIG. 2 is a block diagram showing a constructional example of a control system of a thermal printer P.

FIG. 2 is a control block diagram of the thermal printer P. The control section of this thermal printer P includes a CPU 101 that controls the control section and functions as an energy control means; a ROM 102 for storing a control program and so on which are executed by the CPU 101; a RAM 103 for storing various print formats and so on; an operating section 104 for inputting, setting, or calling print data, print format data and so on; a display section 105 for displaying print data and so on; an interface 106 for inputting and outputting data between the control section and a drive section; a drive circuit 107 for driving the printing thermal head 32; a drive circuit 108 for driving the thermally activating thermal head 52; a drive circuit 109 for driving the movable blade 41 for cutting the heat-sensitive adhesive label 60; a first stepping motor 110 for driving the printing platen roller 33; a second stepping motor 111 for driving the thermally activating platen roller 53 and the inserting roller 54; a label-detecting sensor 112 for detecting the presence or absence of the heat-sensitive adhesive label; a bar-code reading sensor 113 for reading a bar-code fixed to the heat-sensitive adhesive label; an ambient-temperature measuring sensor 114; and a thermal-head-surface-temperature measuring sensor 115.

The ambient-temperature measuring sensor 114 is disposed on the control substrate, and the thermal-head-surface-temperature measuring sensor 115 of the thermally activating thermal head 52 is disposed near the thermally activating thermal head 52 in a noncontact state. Ambient temperature and the surface temperature of the thermally activating thermal head are calculated by appropriately correcting temperature measured with the temperature measuring sensors 114 and 115.

The ROM 102 stores information on, for example, the relationship among ambient temperature, applied energy, and an exhibited bonding property (for example, data corresponding to the graph in FIG. 8 and information on temperature characteristics), and carbonizing temperature of a resin component for each type of heat-sensitive adhesive.

Next, referring to FIGS. 1 and 2, a series of printing process and thermally activating process using the thermal printer P of this embodiment will be described. Principally, the printing unit 30 performs desired printing in accordance with a control signal transmitted from the CPU 101; the cutter unit 40 performs a cutting operation in a predetermined timing; and the thermally activating unit 50 applies designated energy to perform thermal activation.

First, the heat-sensitive adhesive label 60 is drawn out by the rotation of the printing platen roller 33 of the printing unit 30; then the printable surface (heat-sensitive color-forming layer) of which is thermally printed with the printing thermal head 32. Next, the heat-sensitive adhesive label 60 is transferred to the cutter unit 40 by the rotation of the printing platen roller 33. Furthermore, after the heat-sensitive adhesive label 60 has been transferred and taken into the thermally activating unit 50 by the inserting roller 54 of the thermally activating unit 50, it is cut in lengths with the movable blade 41 which operates in a certain timing.

Here, the CPU 101 starts energy control for the thermally activating thermal head 52 in accordance with a detection signal transmitted from the label-detecting sensor 112 provided in the preceding stage of the thermally activating unit 50. It is preferable to start to drive the second stepping motor 111 in synchronization with the first stepping motor 110 using the detection signal from the label-detecting sensor 112 as a trigger. Also, it is preferable to perform driving so that the width of the pulse energized to the second stepping motor 111 is an integer times as large as the width of the pulse energized to the first stepping motor 110 while the tip of the heat-sensitive adhesive label 60 reaches the heating device 51 of the thermally activating thermal head 52.

The first stepping motor 110 and the second stepping motor 111 are accelerated in a simplified manner while they are synchronized with each other such that, for example, the width of the pulse energized to the second stepping motor 111 is eight times as large as the width of the pulse energized to the first stepping motor 110 (motor revolving speed is 1/8) in the first step, seven times (motor revolving speed is 1/7) in the second step, and six times (motor revolving speed is 1/6) in the third step, . . . .

This improves the insertion capability of the heat-sensitive adhesive label 60 into the thermally activating unit 50, thus allowing the thermal printer P to be driven at a high speed. Also, this allows the time until the surface temperature of the thermally activating thermal head 52 reaches a designated temperature to be ensured.

Subsequently, the heat-sensitive adhesive label 60 is heated by energizing the heating device 51 in a certain timing with the heat-sensitive adhesive label 60 sandwiched by the thermally activating thermal head 52 (heating device 51) and the thermally activating platen roller 53. At that time, the pulse width and energizing time are determined by the CPU 101 serving as an energy control means. The energy control process will be described later.

Next, the heat-sensitive adhesive label 60 is ejected by the rotation of the thermally activating platen roller 53; thus, a series of printing process and thermally activating process is completed.

Also, when it has been determined that the heat-sensitive adhesive label 60 had been ejected from the thermally activating unit 50 in accordance with the detection of the terminal of the heat-sensitive adhesive label by the label-detecting sensor 112, the subsequent heat-sensitive adhesive label 60 may be printed, transferred, and thermally activated.

Figure 3:
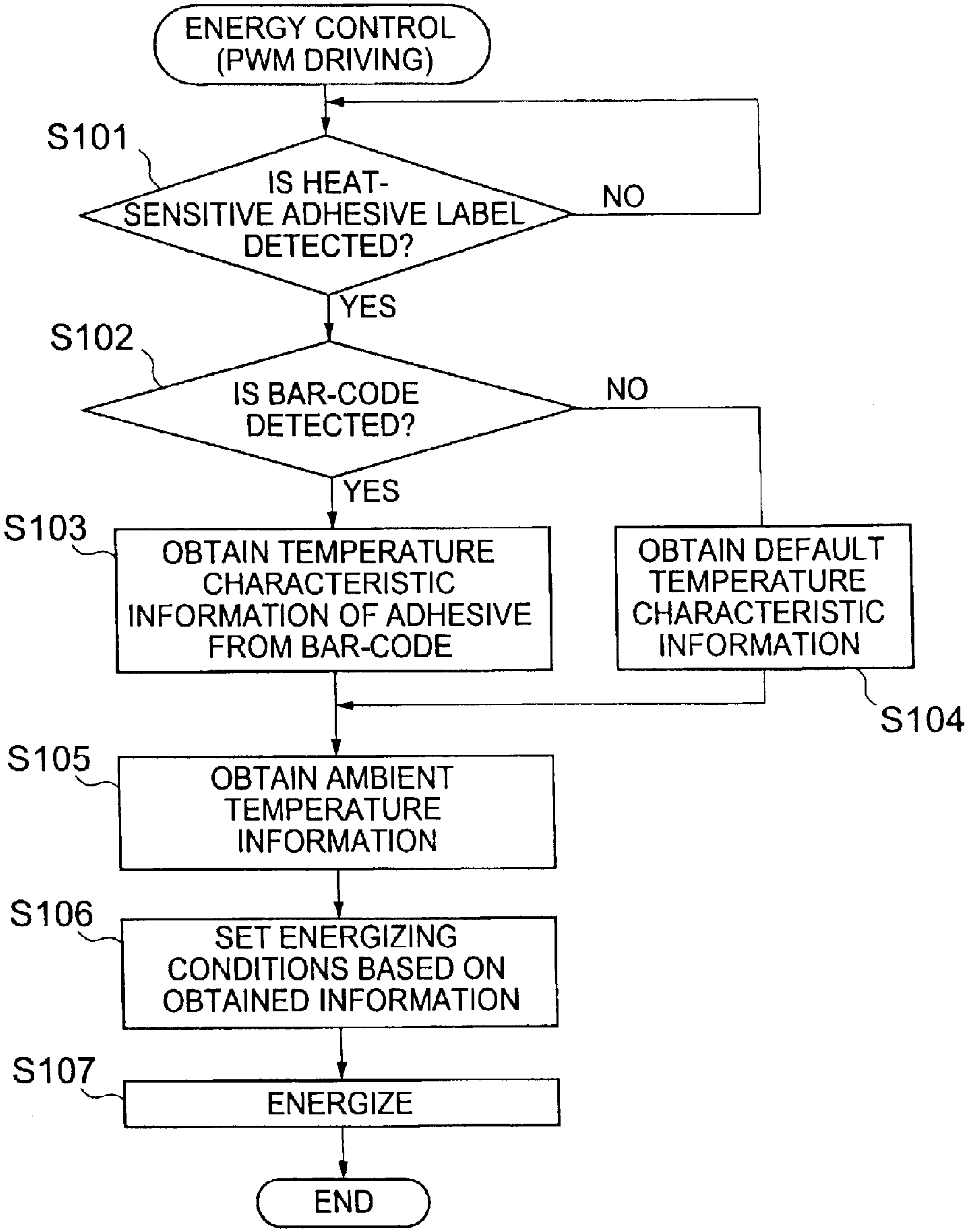
FIG. 3 is a flowchart for energy control processing executed by a CPU 101 serving as an energy control means.

Next, referring to FIG. 3, the energy control process executed by the CPU 101 serving as an energy control means will be described.

First, in step S101, the presence or absence of the heat-sensitive adhesive label 60 is determined on the basis of the detection signal from the label-detecting sensor 112. When it has been determined that the heat-sensitive adhesive label 60 is absent, the process of step S101 is repeated until a detection signal is transmitted from the label-detecting sensor 112.

When it has been determined that the heat-sensitive adhesive label 60 is present in step S101, the process goes to step S102 to determine whether a bar-code is affixed to the heat-sensitive adhesive label 60. Specifically, it is determined according to a detection signal from the bar-code reading sensor 113.

When it has been determined that no bar-code is affixed, the process goes to step S104 to obtain default temperature characteristic information (information on thermal activation). For example, information on the relationship among ambient temperature of an adhesive having an acrylic resin as a resin component, applied energy, and an exhibited bonding property, carbonizing temperature of the acrylic resin and so on is obtained. It is recommended to store this default temperature characteristic information in, for example, the ROM 102 or the like.

On the other hand, when it has been determined that the heat-sensitive adhesive label 60 has a bar-code, the process goes to step S103 to obtain temperature characteristic information of the adhesive of the heat-sensitive adhesive label 60 from the bar-code.

Next, in step S105, actual temperature characteristic information is obtained from the ambient-temperature measuring sensor 114. Then, optimum energy to be applied is determined in accordance with the obtained temperature characteristic information and the information obtained in step S104 or step S105, and pulse energizing conditions (pulse width and so on) for that purpose is set (step S106).

At that time, the setting is made also in view of the carbonizing temperature of the adhesive, which was obtained in step S103 and S104. In other words, the applied energy is controlled so that the surface temperature of the thermally activating head 52 does not reach the carbonizing temperature of the adhesive. Desirably, the pulse energizing conditions are set on the basis of the surface temperature obtained by the thermal-head-surface-temperature measuring sensor 115 of the thermally activating thermal head 52. In other words, when the thermally activating thermal head 52 is storing energy, the surface of the thermally activating thermal head 52 will continue to increase in temperature; therefore, it is important to keep watch on the surface temperature. In this case, since necessary energy can be transmitted to the heat-sensitive adhesive label 60 even under soft energizing conditions, power consumption by thermally activating process can be reduced.

Electric current is passed under set conditions (step S107). In this manner, the heat-sensitive adhesive label 60 is constantly impressed by optimum energy by energy control in this embodiment, thus exhibiting a desired bonding property.

Next, energization patterns will be described when an adhesive that uses a resin component having a carbonizing temperature of 250° C. is thermally activated.

Figure 4A:
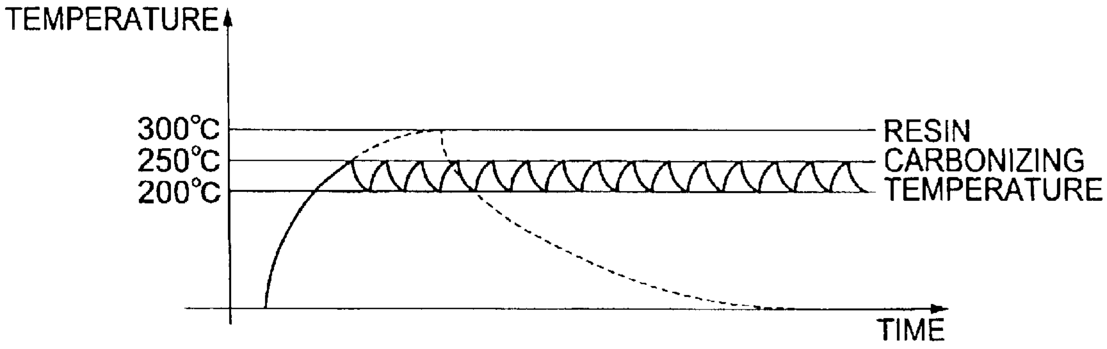
FIG. 4 is a diagram of an example of an energization pattern controlled by the CPU 101, showing the relationship between the surface temperature of a thermally activating thermal head and an exciting pulse.
Figure 4B:
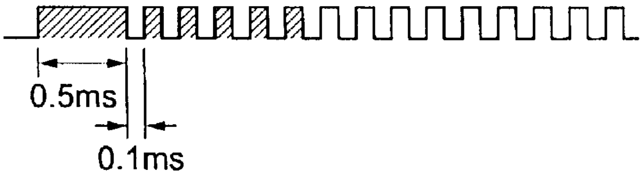

FIG. 4 shows a pattern in which the surface temperature of the thermally activating thermal head 52 is kept between 200° C. and 250° C. For example, a voltage of 24V is passed with a pulse having a width of 0.5 ms to increase the surface temperature of the thermally activating thermal head 52 to 250° C.; thereafter, the pulse is energized/broke at intervals of 0.1 ms. The diagonally shaded areas in FIG. 4(*b*) correspond to energy required for thermally activating the adhesive.

Figure 7:
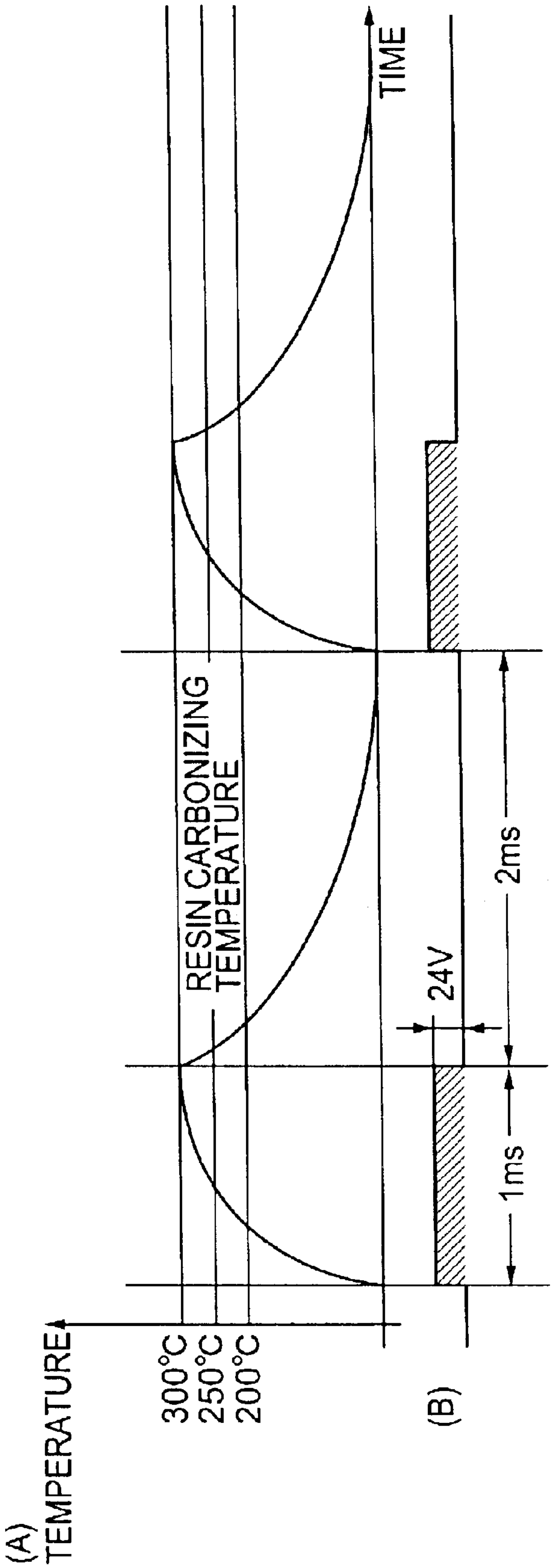
FIG. 7 PRIOR ART
FIG. 7 is a diagram showing the relationship between the surface temperature of a thermally activating thermal head and an exciting pulse in a conventional thermally activating apparatus.

Since electric current was conventionally (see the dotted lines in FIG. 4, and FIG. 7) passed with a pulse having a width of 1 ms, the surface temperature of the thermally activating thermal head 52 was sharply increased to 300° C. On the other hand, in this embodiment, the first pulse width is set to 0.5 ms so that the surface temperature of the thermally activating thermal head 52 is controlled not to exceed the carbonizing temperature of the resin component used in the adhesive. After the surface temperature of the thermally activating thermal head 52 has been increased to 250° C., energization/break is repeated at intervals of 0.1 ms; thus, the adhesive is thermally activated. In this manner, in this embodiment, the surface temperature of the thermally activating thermal head 52 is controlled so as not to reach the carbonizing temperature of the resin component of the adhesive by PWM (pulse-width modulation) driving, thereby preventing the resin component of the adhesive to be carbonized. Accordingly, heat conductivity of the active surface of the heat-sensitive adhesive sheet can be prevented from becoming worse by the adhesion of the carbonized resin component of the adhesive to the thermally activating thermal head 52.

Figure 5A:
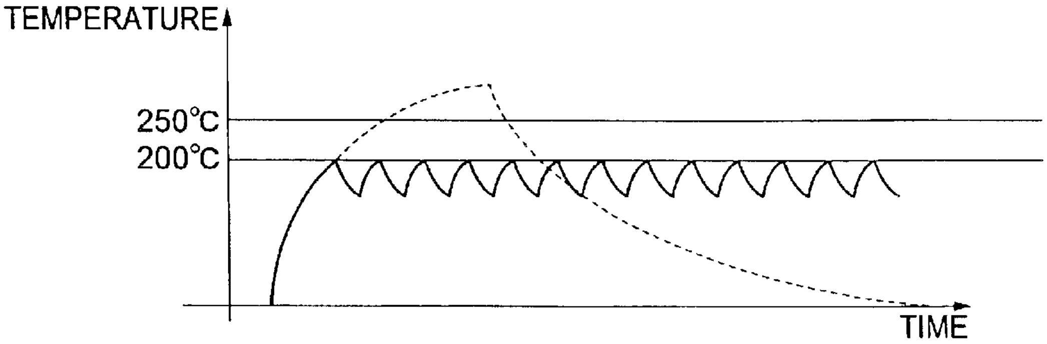
FIG. 5 is a diagram of another example of an energization pattern controlled by the CPU 101, showing the relationship between the surface temperature of a thermally activating thermal head and an exciting pulse.
Figure 5B:

FIG. 5 is different from the pattern of FIG. 4 in that the surface temperature of the thermally activating thermal head 52 is kept between 150° C. and 200° C. For example, first, a 24-V voltage is passed with a pulse having a width of 0.3 ms to increase the surface temperature of the thermally activating thermal head 52 to 200° C.; thereafter, the pulse is energized/broken at intervals of 0.1 ms. Since energy required to thermally activate the adhesive corresponds to the diagonally shaded areas of FIG. 5(*b*), time required for thermal activation increases because the number of times of energization increases as compared with the case of FIG. 4; however, the surface temperature of the thermally activating thermal head 52 does not exceed 200° C., thus reliably preventing the carbonization of the resin component of the adhesive.

Figure 6A:
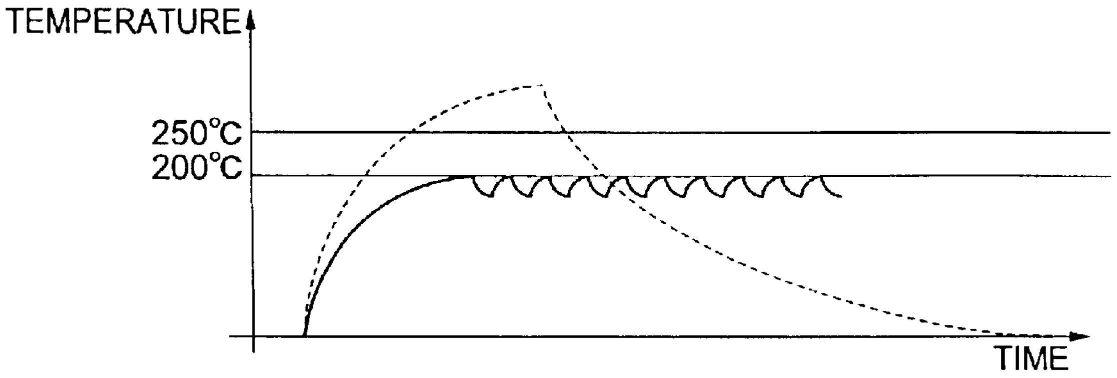
FIG. 6 is a diagram of another example of an energization pattern controlled by the CPU 101, showing the relationship between the surface temperature of a thermally activating thermal head and an exciting pulse.
Figure 6B:

FIG. 6 is different from FIG. 5 in that the voltage to be applied is set lower than 24V. Since energy required for thermally activating the adhesive corresponds to the diagonally shaded areas of FIG. 6(*b*), time required for thermal activation increases because the number of times of energization increases as compared with the case of FIG. 5; however, the surface temperature of the thermally activating thermal head 52 does not exceed 200° C., thus reliably preventing the carbonization of the resin component of the adhesive. In this way, energy to be applied can be controlled also by varying voltage to be impressed.

Up to this point we have specifically described the invention made by the inventors in accordance with specific embodiments. However, the present invention is not limited to the above embodiments, but may variously be modified without departing from the scope and spirit of the invention.

For example, the energization pattern to the thermally activating thermal head may be made in various patterns other than those shown in FIGS. 4 to 6. For example, as the energizing/break intervals of the pulse are decreased, the variations in the surface temperature of the thermally activating thermal head 52 are decreased; therefore, similar energy can constantly be supplied from the thermally activating thermal head. This allows the heat-sensitive adhesive label 60 to be thermally activated while being transferred even if it does not stand still for a certain period of time in the thermally activating unit 50 for thermal activation.

Also, in the above embodiment, while temperature characteristic information of the label is obtained from the bar-code affixed to the heat-sensitive adhesive label 60, other methods are possible. For example, an arrangement is also possible in which markings (label identifying information) for discriminating the type of label are put onto the heat-sensitive adhesive label 60; the used heat-sensitive adhesive is discriminated by reading the markings; and temperature characteristic information of the adhesive is obtained from an information storage means, such as an ROM, an RAM, and a hard disc, provided in the thermally activating apparatus.

Also, in the above embodiment, we described the present invention applied to, for example, a heat-sensitive printer such as a thermal printer. However, the present invention may also be applied to a thermal transfer system, an inkjet system, a laser printing system and so on. In that case, a label whose printable surface is subjected to processing suitable for each printing system in place of a thermal printing layer is used.

Furthermore, in the above embodiment, we described a system of controlling the surface temperature of a thermal head by controlling the width of an applied voltage pulse; however, the surface temperature of the thermal head may be controlled by a pulse-width modulation system whereby the periodicity and amplitude of the applied voltage pulse are kept constant and the duty ratio of the pulse is varied.

According to the present invention, in a thermally activating apparatus for a heat-sensitive adhesive sheet, comprising at least a thermally activating heating means for heating to activate a heat-sensitive adhesive layer of the heat-sensitive adhesive sheet, the adhesive sheet having a printable surface formed on one side of a sheet-like substrate thereof and having the heat-sensitive adhesive layer on the other side, the thermally activating apparatus comprises an energy control means for controlling energy to be applied to the thermally activating heating means by keeping the amplitude of the applied voltage pulse constant and varying the pulse width. Accordingly, the temperature can be kept lower than a carbonizing temperature (for example, 250° C.) of a resin component (for example, acrylic resin) of the heat-sensitive adhesive; and energy necessary for activating the adhesive can sufficiently be applied. Consequently, the resin is prevented from being carbonized on the surface of the thermally activating heating means; thus, energy can efficiently be transmitted from the heating means to the heat-sensitive adhesive, producing the effect of exhibiting a desired bonding property.

What is claimed is:

1. A thermally activating apparatus for a heat-sensitive adhesive sheet having sheet identifying information including information on a heat-sensitive adhesive used for the sheet, the apparatus comprising;

thermally activating heating mans for heating a heat-sensitive adhesive layer of the heat-sensitive adhesive sheet to activate the adhesive layer, the adhesive sheet having a printable surface formed on one side of a sheet-like substrate and the heat-sensitive adhesive layer formed on the other side thereof;

sheet-identifying-information reading means for reading the sheet identifying information; and energy control means for controlling energy to be applied to the thermally activating heating means by keeping the amplitude of applied voltage pulses constant and varying the pulse width and for controlling the energy applied to the thermally activating heating means on the basis of the information obtained by the sheet-identifying-information reading means.

2. A thermally activating apparatus for a heat-sensitive adhesive sheet according to claim 1, wherein the thermally activating heating means comprises a thermal head having a plurality of heating devices.

3. A thermally activating apparatus for a heat-sensitive adhesive sheet according to claim 1, wherein the sheet identifying information includes information on thermal activation of the heat-sensitive adhesive used for the sheet, and the sheet-identifying-information reading means reads the information on the thermal activation of the heat-sensitive adhesive.

4. A thermally activating apparatus for a heat-sensitive adhesive sheet according to claim 1, further comprising a information recording means for recording information on the thermal activation of the heat-sensitive adhesive; and wherein the energy control means obtains the information on the thermal activation of the heat-sensitive adhesive from the information recording mans on the basis of the information obtained by the identifying-information reading means, and controls the energy applied to the thermally activating heating means.

5. A thermally activating apparatus for a heat-sensitive adhesive sheet according to claims 1, further comprising ambient-temperature measuring means for measuring temperature in the vicinity of thermally activating processing of the heat-sensitive adhesive sheet by the thermally activating heating means; and wherein the energy control means controls the energy applied to the thermally activating heating means on the basis of the temperature measured by the ambient-temperature measuring means.

6. A printer comprising:

the thermally activating apparatus for the heat-sensitive adhesive sheet according to claim 1; and printing means for printing on the heat-sensitive adhesive sheet.

7. An apparatus for thermally activating a heat-sensitive adhesive sheet having a printable surface on one side and a heat-sensitive adhesive layer on the other side and containing sheet identifying information including information concerning one or more properties of the adhesive used in the adhesive layer, the apparatus comprising: an energizeable heating unit for heating the heat-sensitive adhesive layer to activate the same; a reading sensor for reading the sheet identifying information; and a control section for controlling energy applied to the heating unit on the basis of the sheet identifying information read by the reading sensor.

8. An apparatus according to claim 7; wherein the control section controls the energy applied to the heating unit by keeping the amplitude of applied voltage pulses constant and varying the pulse width.

9. An apparatus according to claim 7; wherein the sheet identifying information includes information concerning thermal activation of the adhesive layer; and the reading sensor reads the information concerning the thermal activation of the adhesive layer.

10. An apparatus according to claim 7; wherein the reading sensor comprises a bar-code reading sensor.

11. An apparatus according to claim 7; further including an ambient-temperature measuring sensor for measuring temperature in the vicinity of the heating unit; and wherein the control section controls the energy applied to the heating unit on the basis of the temperature measured by the ambient-temperature measuring sensor.

12. An apparatus according to claim 7; wherein the information concerning one or more properties of the adhesive includes information concerning a carbonizing temperature of a resin component of the adhesive; and the control section controls the energy applied to the heating unit to maintain the temperature of the adhesive below the carbonizing temperature.

13. A printer comprising: the apparatus according to claim 7; and a printing unit or printing on the heat-sensitive adhesive sheet.

* * * * *